United States Patent
Köllges (10) Patent No.: US 12,434,336 B2
(45) Date of Patent: Oct. 7, 2025

(54) METHOD FOR INSTALLING AND/OR MAINTAINING A FLANGE CONNECTION, AND TOOL AND USE

(71) Applicant: SCHAAF GmbH & Co. KG, Erkelenz (DE)

(72) Inventor: Ralf Köllges, Erkelenz (DE)

(73) Assignee: SCHAAF GmbH & Co. KG, Erkelenz (DE)

( * ) Notice: Subject to any disclaimer, the term of this patent is extended or adjusted under 35 U.S.C. 154(b) by 348 days.

(21) Appl. No.: 17/970,725

(22) Filed: Oct. 21, 2022

(65) Prior Publication Data
US 2023/0041918 A1 Feb. 9, 2023

Related U.S. Application Data (63) Continuation of application No. PCT/EP2021/060583, filed on Apr. 22, 2021.

(30) Foreign Application Priority Data

Apr. 22, 2020 (DE) .......................... 102020110895.8

(51) Int. Cl.
*B23P 19/06* (2006.01)
*B23Q 15/14* (2006.01)

(52) U.S. Cl.
CPC ............ *B23P 19/067* (2013.01); *B23Q 15/14* (2013.01); *B23Q 2717/00* (2013.01)

(58) Field of Classification Search
CPC ........ B23P 19/067; B23P 19/06; B23Q 15/14; B23Q 2717/00; F03D 13/10; F03D 13/20;
(Continued)

(56) References Cited

U.S. PATENT DOCUMENTS 8,763,469 B2 * 7/2014 Knoop .................... F03D 13/20
73/761
9,168,644 B2 * 10/2015 Imi ....................... B25B 21/002
(Continued)

FOREIGN PATENT DOCUMENTS

EP 3566815 A1 11/2019
EP 3593939 A1 1/2020
(Continued)

OTHER PUBLICATIONS

International Search Report issued in corresponding International Application PCT/EP2021/060583, mailed Aug. 2, 2021.

*Primary Examiner* — Lawrence Averick
(74) *Attorney, Agent, or Firm* — Burris Law, PLLC (57) ABSTRACT

A method for installation and/or maintenance of a flange connection includes screw connections with a manually movable tool including a screw tensioning structure, a processing unit and a screw identification sensor. The method includes assigning a one-to-one identification to each screw connection of the flange connection, determining a screw connection to be tensioned, positioning the tool on a respective screw connection to be tensioned, identifying the respective screw connection by the screw identification sensor, releasing the screw tensioning structure by the processing unit, and tensioning the respective screw connection by the screw tensioning structure. It is checked whether the tool or the screw tensioning structure is placed correctly on the screw connection. The screw tensioning structure is released when the result of this check is positive and/or the screw tensioning structure is blocked or stopped when the result of this check is negative.

11 Claims, 1 Drawing Sheet

(58) Field of Classification Search
CPC ........... F05B 2230/60; F05B 2260/301; Y02E 10/72; Y02P 70/50; B25B 29/02
See application file for complete search history.

(56) References Cited

U.S. PATENT DOCUMENTS

| | | | |
|---|---|---|---|
| 9,212,651 | B2 | 12/2015 | Johst et al. |
| 10,702,960 | B2* | 7/2020 | Johst ................... B23P 19/067 |
| 10,857,636 | B2 | 12/2020 | Hohmann et al. |
| 11,148,240 | B2* | 10/2021 | Hohmann ............ B23P 19/067 |
| 11,311,973 | B2* | 4/2022 | Hohmann ............... F03D 13/10 |
| 2011/0232071 | A1* | 9/2011 | Knoop .................. E04H 12/085 |
| | | | 403/42 |
| 2013/0205575 | A1* | 8/2013 | Imi ........................ G21C 19/20 |
| | | | 81/55 |
| 2019/0030665 | A1* | 1/2019 | Johst ................... B23P 19/067 |
| 2019/0299344 | A1* | 10/2019 | Hohmann ........... B25B 23/0085 |
| 2019/0299346 | A1* | 10/2019 | Hohmann ............... F03D 13/10 |

FOREIGN PATENT DOCUMENTS

| | | |
|---|---|---|
| JP | 2002239939 A | 8/2002 |
| KR | 1020130026039 A | 3/2013 |
| WO | 2018010744 A1 | 1/2018 |

\* cited by examiner

METHOD FOR INSTALLING AND/OR MAINTAINING A FLANGE CONNECTION, AND TOOL AND USE

CROSS-REFERENCE TO RELATED APPLICATIONS

This application is a Bypass Continuation of International Application No. PCT/EP2021/060583, filed on Apr. 22, 2021, which claims priority to and the benefit of DE 102020110895.8 filed on Apr. 22, 2020. The disclosures of the above applications are incorporated herein by reference.

FIELD

The present disclosure relates to a method for installation and/or maintenance of a flange connection as well as a manually movable tool for installation and/or maintenance of a flange connection and a use of the tool.

BACKGROUND

The statements in this section merely provide background information related to the present disclosure and may not constitute prior art.

Methods for installation of flange connections are generally known. EP 3 593 939 A1 discloses a method for screw connection of a flange connection in which at least a plurality of gap dimensions assignable to the bolt systems is measured between the first flange and the second flange by means of a gap measuring device, wherein the individual measured gap dimensions can be evaluated and stored assignably to the individual bolt systems, wherein the bolt systems are tightened by means of a tightening means in a sequence depending on the gap dimensions assigned to these.

A disadvantage with this known method is that the plurality of screw connections which must be tightened, for example, on flanges of a wind turbine, can make the fitter lose track of which screw has already been tightened and which is still to be tightened.

WO 2018/010744 A1 discloses a method for controlling operation of a power tool system for assembly of a wind turbine in which screw connections of bolts and nuts are tightened with the aid of a manually movable tool in the form of a bolt tensioning tool. The bolt tensioning tool includes a tensioning device. The bolt tensioning tool is released by means of a control means if a bolt has been unambiguously identified with the aid of a barcode or an RFID label.

DE 10 2008 016925 A1 discloses a method for constructing a wind turbine in which fastening means includes screws and screw nuts are tightened with the aid of a testing device, wherein the tightening of each fastening means is checked taking into account an identifier assigned in each case. The testing device includes a tool portion for tightening the fastening means, a detection unit for detecting the identifiers and a data processing device for processing the data of the fastening means.

EP 3 597 369 A1 discloses a method for the documented tightening or re-tightening of a screw connection including a threaded bolt and a nut screwed thereon, supported on a flange surface, as well as a screw tensioning device. The screw tensioning device includes a tensioning cylinder supported against the flange surface with an exchangeable socket and a rotary sleeve driven by an electric motor, a process control module with a documentation module, a manual switch, a detection device arranged on the tensioning cylinder and a distance sensor arranged on the tensioning cylinder. In the method, the exchangeable socket is screwed onto the free threaded end of the threaded bolt, the exchangeable socket is tightened hydraulically by means of longitudinal stretching of the bolt and during this the nut is co-rotated by rotating the rotary sleeve connected thereto in a torque-proof manner. The manual switch allows only an electric drive of the exchangeable socket in a first operating mode and only an electric drive of the rotary sleeve in a second operating mode. Using the process control unit, the screw connection is identified by means of the detection device and an identity feature characterizing the individual screw connection is stored in the documentation module. After placing the tensioning cylinder on the screw connection, a distance A from the flange surface is detected by means of the distance sensor and a corresponding first distance signal is transmitted to the process control unit. Then, in the first operating mode, the exchangeable socket is screwed onto the free threaded end and the distance A from the flange surface is again detected by means of the distance sensor, and a corresponding second distance signal is transmitted to the process control unit. From the difference of the distance signals, the process control unit determines the magnitude of the thread engagement between the exchangeable socket and the free threaded end, and the process control unit only releases a switchover into the second operating mode when there is a predefined minimum thread engagement. After the switchover into the second operating mode by means of the manual switch, the threaded bolt is stretched longitudinally and a characteristic load value for the tensile force acting on the exchangeable socket and/or the applied hydraulic pressure is stored in the documentation module and allocated to the respective identity feature.

KR 10 2013 0026039 A discloses a maintenance robot for a wind power generator which is capable of carrying out a method for the automatic fastening, checking and marking of screw connections including bolts and nuts, which are connected to the flange unit of a tower segment. The maintenance robot includes a robot body, a drive unit, a first arm and a second arm. The drive unit moves the robot body along the side of the flange unit. The first arm extends in a first direction from the robot body and is equipped with a nut fastening unit. The second arm extends in a second direction from the robot body and is equipped with a screw fastening unit.

EP 3 566 815 A1 discloses a method for tensioning fastening means including bolt systems of bolts and nuts, and a receiving device including two flanges with flange recesses by means of a fastening arrangement. The fastening arrangement includes a tensioning device and an anti-twist device which has an upper end region and a lower end region. The upper end region is configured in such a manner that the anti-twist device can be fixed rotationally by means of the tensioning device. The lower end region is configured in such a manner that the bolt can be fixed rotationally. The method includes the steps: a) introducing the bolt into a flange recess of the receiving device; b) mounting the tensioning device on a nut side of the receiving device; a) arranging the anti-twist device in the tensioning device so that the anti-twist device is fixed rotationally; d) arranging the anti-twist device on the bolt so that the bolt is fixed rotationally; and e) tensioning the fastening means by means of the tensioning device.

SUMMARY

This section provides a general summary of the disclosure and is not a comprehensive disclosure of its full scope or all of its features.

The present disclosure provides a method, a tool and a use which improves the methods and tools known from the prior art. That is, the present disclosure provides a method and a tool such that a flange connection can be screwed together securely and free from error.

The present disclosure provides a method for installation and/or maintenance of a flange connection including a plurality of screw connections with a manually movable tool at least including a screw tensioning structure, a processing unit and a screw identification sensor. The method includes assigning a one-to-one identification to each screw connection of the flange connection, determining a screw connection to be tensioned, positioning the tool on the screw connection to be tensioned, identifying the screw connection by the screw identification sensor, releasing the screw tensioning structure by the processing unit, and tensioning the screw connection by the screw tensioning structure, wherein it is checked whether the tool or the screw tensioning structure is placed correctly on the screw connection and the screw tensioning structure is released if the result of this check is positive and/or the screw tensioning structure is blocked or stopped if the result of this check is negative or not positive.

Furthermore, the present disclosure provides a manually movable tool for installation and/or maintenance of a flange connection including a plurality of screw connections. The screw connections include a screw tensioning structure, a processing unit, a screw identification sensor, and a sensor that is configured to detect a distance between the screw connection and the tool and/or a distance between the screw connection and the screw tensioning structure. The screw connections of the flange connection can be identified by the screw identification sensors or by the processing unit. Operation of the screw tensioning structure can only be released when the position of the tool above the screw connection predefined by a processing unit can be identified by the sensor and the processing unit. It can be checked whether the tool or the screw tensioning structure is placed correctly on the screw connection and the screw tensioning structure can be released by the processing unit when the result of this check is positive and/or the screw tensioning structure can be blocked or stopped when the result of this check is negative or not positive.

The present disclosure also provides the use of the manually movable tool for installation and/or maintenance of a flange connection.

The present disclosure provides a method for installing and/or maintenance of a flange connection. The flange connection includes a plurality of screw connections and a manually movable tool including a screw tensioning structure, a processing unit and a screw identification sensor. The method includes the following steps assigning a one-to-one identification to each screw connection of the flange connection, determining a screw connection to be tensioned, positioning the tool on the screw connection to be tensioned, identifying the screw connection by the screw identification sensor, releasing the screw tensioning structure by the processing unit, and tensioning the screw connection by the screw tensionin structure.

In one form, it is checked, and may optionally be documented, that all process-relevant steps have been carried out on the respective screw connection, optionally determined by a screw identification structure.

In one form, it is provided that the screw connections are pre-installed in the flange connection. The screw connections are optionally inserted by hand and screwed. For example, the screw connections are screwed by hand or using an impact screwdriver in particular in a pre-installation.

In another form, it is provided that the screw connection in the pre-installation is tightened by up to about 1000 Mn.

In yet another form, in particular when the method is used for maintenance of a flange connection, the screw connections are tensioned hydraulically by a screw tensioning structure.

Screw connections may include at least one bolt, a nut and a counter bearing. In one form, the counter bearing includes a screw head which is connected directly to a bolt material.

In another form, the counter bearing includes at least one counternut. Furthermore, in one form, the screw connection can have at least one washer. In one form, the screw connection can have two washers. In another form, it is provided that the nut has a nut internal thread that corresponds to the external thread of a pre-tensioned bolt. Further, a contact surface of the nut may optionally be configured in such a manner that no washer needs to be used with this. In one form, the nut may have a flat contact surface which further may optionally be configured at right angles to a thread axis of the nut. If the counter bearing is configured as a counternut, the above explanations for the nut also apply to the counternut of the counter bearing. In one form, the bolt may be a threaded bolt whose external thread corresponds with the internal thread of the nut and optionally the counternut or whose geometry of the external thread, when a maximum force is applied to the bolt, corresponds with the nut internal thread and optionally the counternut internal thread. In one form, the screw connection is an HV screw fitting.

The flange connection includes at least one first flange with at least one first flange recess and a second flange with at least one second flange recess. In one form, the flange may have a plurality of flange recesses into which a multiplicity of screw connections can be introduced. The flange recesses of the first flange and of the second flange may optionally be aligned flush with one another so that the screw connection can be placed therein.

When installing large flanges such as are found, for example, in wind turbines or cranes, a very large number of screw connections need to be tightened by one or more fitters. In order to maintain the secureness, the screws are tensioned in a predefined tensioning sequence. When there is a large number of screw connections, fitters can lose sight of which screw connection has been tensioned and which not. Furthermore, the tensioning sequence cannot be directly apparent for the fitter if, for example, the tensioning sequence is dependent on gap dimensions of the flange connection. The proposed method and the tool have the advantage that the fitter must tension or assess each screw connection in the sequence of the tensioning connection since otherwise the tool cannot be operated. Furthermore, by the proposed method and tool, a documentation of the tensioning of the screw connection at the flange connection is substantially simplified.

The method can be implemented inter alia using a manually movable tool.

The tool includes a screw tensioning structure. The screw tensioning structure can, for example, be configured as a torque wrench, an electric torque screwdriver, hydraulic torque screwdriver, pneumatic torque screwdriver or screw tensioning device. In one form, a screw tensioning structure that is configured as a screw tensioning device can hydraulically produce a pre-tension in the screw connection. The screw tensioning structure is operated by a fitter in one form.

The tool includes a processing unit. In one form, the screw tensioning structure can be controlled by the processing unit. Thus, in one form, it is provided that the processing unit can block and/or release the screw tensioning structure.

In one form, it is provided that a function of the tool is blocked when an incorrect positioning is identified. For example, an operation of the screw tensioning structure can be blocked and/or released in such a manner by the processing unit.

In another form, it is provided that, for example, a force, a pressure and/or other parameters can be predefined by the processing unit, by which the screw tensioning structure pre-tensions the screw connections.

Exemplary listings should not be regarded as definitive in the sense of the present disclosure but can be supplemented within the framework of general technical knowledge.

The tool includes a screw identification sensor. In one form, an identification which is assigned to a screw connection can be read out by a screw identification sensor.

In order to implement the method, in one form, it is provided that the screw connection is characterized one-to-one by identification indicia. In one form, the screw connections in the flange connection are characterized one-to one so that each screw connection can be unambiguously identified in the flange connection. For example, the screws can have identification indicia which identify the respective screw. In another form, it is provided that the flange recesses, e.g., the pairs of flange recesses of the first flange, and the second flange which are flush with one another, are provided with identification indicia. In this form, the identification can still exist even when a screw connection of a flange recess is exchanged. The new screw connection thus receives the identification indicia of the preceding screw connection when exchanged. In yet another form, the identification indicia is optionally exchanged with the screw connection.

In one form, it is provided that radio-readable chips, optical codes and/or absolute or relative positions on the flange connection are used as identification indicia. For example, stickers or imprints can be applied to the screw connections and/or to at least one flange of the flange connection. For example, the screw connection and/or the flange can be provided with transponders for identification with the aid of electromagnetic waves—so-called RFID transponders, optical codes—such as QR codes for example and/or signs—such as numbers and/or letters, for example. In one form, it is provided that in addition to or alternatively to the identification indicia, an identification takes place by satellite-assisted positioning, for example, by GPS, Galileo and/or BeiDou.

The next screw connection to be tensioned is determined. In one form, it is provided that a tensioning sequence is determined or predefined by the processing unit, by which the screw connection to be tensioned is determined. The tensioning sequence can include a tensioning of screw connections successively on the flange connection. Furthermore, the tensioning sequence can include a screwing of mutually opposite screws. In one form, it is provided that a plurality of gap dimensions assignable to the screw connections is measured between the first flange and the second flange, wherein the individual measured gap dimensions can be evaluated and stored assignably to the individual bolt systems, such as by the processing unit, wherein the tensioning sequence provides a sequence of the tensioning of the screw connections depending on the gap dimensions assigned to these. Further, screw connection which are assigned a larger gap dimension may be tightened before screw connections which are assigned a smaller gap dimension are tightened. In another form, the screw connections are grouped and tightened according to their assigned gap dimension. In one form, it is provided that a method according to EP 3 593 939 A1 to which reference is made in its full scope is applied to determine a tensioning sequence.

The tool is moved to at least one flange of the flange connection in order to arrive at the next screw connection to be tensioned. Further in so doing, it may run over the screw connections. Further, the tool may be moved on the flange in such a manner that the screw identification sensor can read out the identification indicia.

Further, a positioning of the tool on the screw connection to be tensioned is provided. In one form, it is provided that a correct or incorrect positioning of the tool is signalled by a signal unit. The signal unit can, for example, indicate that the tool is positioned over the incorrect, i.e., not the next screw connection provided in the tensioning sequence. Furthermore, in one form, the signal unit can indicate that the tool is positioned over the correct, that is the next screw connection provided in the tensioning sequence. In another form, it is provided that the signal unit a direction is indicated which gives the fitter an indication of the direction in which the next screw connection to be tensioned is located. In yet another form, it is provided that the signal unit displays the identification, for example a screw identification number of the next screw connection to be tensioned.

In one form, it is provided that the signal is controlled by the processing unit. In another form, it is provided that the processing unit receives a signal of the screw identification sensor.

Furthermore, an identification of the screw connection by the screw identification sensor is provided. In one form, it is provided that the screw identification sensor reads out the identification indicia that is assigned to the screw connection over which the tool is positioned. In one form, an optical code or a transponder is read out in order to identify the screw connection.

In one form, it is provided that the identification indicia is read out in a process-step-dependent manner, continuously or at intervals. Particularly it is provided that a process-step-dependent readout of the identification indicia may take place directly before and/or after a process-relevant step. In another form, it is provided that in all process-relevant steps or at the end of a process-relevant step a check takes place as to whether the tool is positioned over the correct screw connection. In one form, it is provided by a continuous readout or a readout at short intervals that the processing unit is notified at all times or can enquire of the identification indicia as to which screw connection the tool is located on in order to appropriately control the signal unit and/or the screw tensioning structure. Short intervals are intervals of less than about one second.

Process-relevant steps in the sense of the present disclosure are at least a loosening of the screw connection, a release of the screw tensioning structure and/or a tensioning of the screw connection. In one form, a documenting of at least one parameter, a printing on the flange, a printing on paper and/or other process steps are process-relevant steps. In one form, it is documented whether the correct screw has been tensioned. In so doing, all process-relevant parameters and events are documented. The documentation can be stored electronically, printed out on paper and/or printed on at least one flange of the flange connection. Previously defined data can also be created separately in special logging forms. An incorrect operation and/or target values of the screw connection not reached may also be documented.

When the term "about" is used in connection with values or value ranges within the scope of the present disclosure, this should be understood as a tolerance range which the person skilled in the art in this field deems to be usual, preferably a tolerance range of ±20%, preferably ±10%, further preferably ±5% is preferred.

In one form, it is provided that in each process steps the screw connection is identified by the screw identification sensor. In one form, at least before each process step, the screw identification sensor scans whether the tool is still positioned over the screw connection to the tensioned. With a continuous scanning, an intentional or unintentional mishandling or a deviation from a predefined tensioning sequence may be reliably inhibited. Further, advantageously human error and tampering are reduced by the proposed method.

Furthermore, a release of the screw tensioning structure by the processing unit is provided. Operation of the screw tensioning structure is released. For example, a release is an activation of a hydraulic pressure generator of the screw tensioning structure which may be disconnected from the power without the activation. In one form, the screw tensioning structure, as a hand pump, can be blocked mechanically. In another form, it is provided that an incorrect operation, an attempt at an incorrect operation is recorded. In yet another form, it is provided that in the event of an incorrect operation, no recording is made and the screw connection may be deemed to be not tensioned by the tool.

In one form, it is provided that a release of the next process step only takes place when there is a correct positioning of the tool. In one form, it is provided that a release of the screw tensioning structure only takes place when the tool is positioned correctly. In another form, it is provided that a release of the screw tensioning structure only takes place when the screw connection to be tensioned is determined by the screw identification sensor. In another form, it is provided that a release of the next process step only takes place when the screw connection to be tensioned has been identified and correctly determined by the screw identification sensor. This has the advantage that the fitter cannot perform a tensioning of the screw connection of the flange in the incorrect sequence. It is also inhibited by the method according to the present disclosure that a screw connection can be forgotten or overlooked when assembling the flange.

Furthermore, the tensioning of the screw connection by the screw tensioning structure is provided.

The tensioning can, for example, have the following sequence (a) applying a tensile force until a restoring force or until a restoring pressure, for example, of about 30 bar to about 100 bar is reached, (b) applying a tensile force to a bolt of the screw connection until a certain maximum force is reached and determining, which may optionally be determined continuously during application of the tensile force, an elongation value which correlates with a bolt elongation, a screw tensioning structure compression and/or a flange compression of the flange connection, (c) subsequently turning a nut of the screw connection with a specific torque, (d) releasing the tensile force to 0 N, and (e) bringing the tensile force up to the restoring force.

Steps a) to d) are repeated at least once in one form.

The method may be documented before, during and/or after each step.

The said steps of the exemplary tensioning are not limiting. Further working sequences can also be possible even nested in one another in further forms, wherein all the steps may be documented.

In one form, it is provided that parameters of the tensioning of the screw connection are documented by the processing unit. Parameters can, for example, include a screw identification number, a maximum force, an elongation value, a screw tensioning structure compression, a flange compression, a pre-tensioning force achieved, results of a distance measurement and/or angle measured during tensioning of the screw connection, name of the fitter, a name of the firm, flange designation, diameter of the screw connection, a tensioning force applied by the screw tensioning structure, a hydraulic pressure, a loosening force, a batch number in particular of all the tools used, a batch number or an identifier of the screw connection or its individual parts, a software version of the processing unit, a date, a time, a designation of the operation performed, a qualitative statement about the success of the tensioning of the screw connection, an ambient temperature and/or a rotation angle of the nut of the screw connection. The documentation of the tensioning of the screw connections can take place before, during and/or after the tensioning of the screw connection by the screw tensioning structure.

In one form, at least one of the parameters of the tensioning of the screw connection is signalled and/or displayed by a signal unit. This signalling and/or this display may be accomplished after each tensioning process and/or after the tensioning process of the last screw connection in the tensioning sequence.

In another form, it is provided that at least one parameter of the tensioning of the screw connection on at least one flange of the flange connection is documented. For this purpose it is provided in one form that the at least one parameter, are printed on the flange. In one form, all process-relevant parameters are printed on the flange. In one form, the tool has a printer which automatically or semi-automatically prints the at least one parameter on the flange. At least one parameter can be printed in a form legible for humans. In a further form, it is provided that at least one parameter is printed on the flange in machine-readable form, for example, as an optically readable code.

In one form, the printer is arranged on the chassis. In another form, it is provided that a numbering is applied to the flange connection by a printer. The numbering may be predefined by a client or a manufacturer of a wind turbine, for example. The printer may print the predefined numbering on the flange. Predefined numberings or other identification indicia can be printed on the flange by the printer, in particular if no other identification indicia are printable on the flange, in particular if no identification indicia are provided on the flange. In one form, an identification round takes place during a first installation when the tool is driven over all the screw connection and during this or thereafter the identification indicia may be applied to the flange by the printer. Further, during the identification round a gap measurement is made in which a gap dimension between the flanges in each screw connection may be determined. In another form, it is provided that all process-relevant parameters, e.g., all the parameters which are stored in the processing unit, and optionally all the parameters which are marked as process-relevant in the processing unit, are printed on the flange. Parameters assigned to each screw connection may be printed on the flange. The parameters can be applied to the flange in a machine-readable manner, e.g., as QR code or in clear text.

An advantage of printing parameters on at least one flange of the flange connection is that, for example, during a subsequent maintenance, in which the information from the processing unit is not provided, the fitter has the process-relevant parameters for maintenance immediately provided.

In one form, it is provided that screw connections are introduced by hand into a flange connection, for example, of a wind turbine.

The flange connection includes a number of screw connections. The screw connections may be introduced by hand before a first assembly and screwed into flange recesses of the flange connection arranged one above the other in pairs. Each screw connection is assigned identification indicia wherein the assignment is one-to-one. The identification indicia are applied to the inside of the flange connection, printed on and configured as optically readable code, for example, as QR code or a transponder in or on the screw. The tool is placed on the flange connection so that this can move over the screw connections. The tool may be guided by hand over the screw connections, wherein the screw identification sensor reads out the identification indicia of the screw connections. A tensioning sequence is predefined by the processing unit from which a screw connection to be tensioned is determined. As long as the tool is not located above the screw connection to be tensioned, the screw tensioning structure is not released so that the fitter cannot operate this. Once the tool has arrived above the screw connection to be tensioned, this may be signalled by the signal unit, the screw tensioning structure is released. The fitter can then operate this in order to tension the screw connection. Should the fitter accidentally move the tool away over the screw connection to be tensioned, the screw tensioning structure may be immediately shut off.

In one form, a conclusion protocol is created by the determined and recorded data from which it follows which screw connections are correctly tensioned and/or are technically in order. In one form, it follows from the conclusion protocol and/or from a further error protocol which screw connections are defective and wherein the defects exist.

In one form, the error protocol contains recommendations for the correction of defective screw connections and/or errors. The recommendations include, for example, the renewed tensioning of a defective screw connection, exchange of defective screw connections for a new or defect-free screw connection or the correct adjustment of a defective bolt overhang.

In one form, the conclusion protocol and/or the error protocol and/or the recommendations are signalled and/or displayed by a signal unit. This signalling and/or this display may be accomplished after each tensioning process and/or after the tensioning process of the last screw connection in the tensioning sequence. The conclusion protocol and/or the error protocol and/or the recommendations can be created, for example, by the processing unit.

In an exemplary form of the method, it is checked whether the tool or the screw tensioning structure is correctly placed on the screw connection. The screw tensioning structure is released when the result of this check is positive and/or the screw connection structure is blocked or stopped when the result of this check is negative or not positive.

This configuration increases the safety of the fitter. This is because if the tool or the screw tensioning structure is not correctly placed on the screw connection, there is the risk that the tool or the screw tensioning structure will be damaged during operation of the screw connection and/or unexpectedly strips the thread of the bolt with the result that the fitter can be injured.

The checking can take place as required in any manner, for example, with the aid of a sensor that is configured to detect a distance between the screw connection and the tool and/or a distance between the screw connection and the screw tensioning structure. In one form, the release is only accomplished when the result of this examination is positive. This means that a positive result of this examination is a desired condition for the release and in particular must be present together with at least one of the remaining conditions which are mentioned in this patent application in connection with a release. The checking and/or the release take place, for example, by the processing unit.

The result of this examination may be signalled and/or displayed by a signal unit. This signalling and/or this display is accomplished after each tensioning process and/or after the tensioning process of the last screw connection in the tensioning sequence.

In the exemplary form of the method according to the present disclosure, it is checked whether a bolt overhang of the screw connection is greater than a predetermined lower threshold value. The screw tensioning structure is released when the result of this check is positive and/or the screw connection structure is blocked or stopped when the result of this check is negative or not positive.

The bolt overhang of the screw connection is the length of that threaded portion of the bolt of this screw connection that projects from the nut of this screw connection.

This configuration increases the safety of the fitter. This is because if the bolt overhang goes below a lower threshold value, there is then the risk that the tool or the screw tensioning structure does not act sufficiently firmly on the bolt and during operation rips off abruptly from the bolt, with the result that the fitter can be injured.

This checking can be carried out as required in any manner and includes, for example, that the bolt overhang is measured and compared with the lower threshold value. The measurement can take place a required in any manner, for example, in the manner disclosed in EP 3 566 815 A1 and/or with the aid of the fastening arrangement for tensioning fixing means disclosed in EP 3 566 815 A1 and/or within the framework of the method for tensioning fixing means disclosed in EP 3 566 815 A1. The disclosure content of EP 3 566 815 A1 is herewith included in this description by reference in its full scope and particular with regard to the points specifically mentioned previously. In one form, release is only accomplished when the result of this check is positive. This means that, in one form, a positive result of this check is a necessary condition for the release and in particular must be present together with at least one of the remaining conditions which are mentioned in this patent application in connection with a release. The checking and/or release is accomplished, for example, by the processing unit.

In one form, the result of this check is signalled and/or displayed by a signal unit. This signalling and/or this display may be accomplished after every tensioning process and/or after the tensioning process of the last screw connection in the tensioning sequence.

In an exemplary form of the method, it is checked whether a bolt overhang of the screw connection is smaller than a predetermined upper threshold value. The screw tensioning structure is released when the result of this check is positive and/or the screw connection structure is blocked or stopped when the result of this check is negative or not positive.

This configuration increases the safety of the fitter. This is because if the bolt overhang exceeds the upper threshold value, there is then the risk that the tool or the screw tensioning structure does not completely or not satisfactorily or not correctly tension the bolt and/or the tool or the screw tensioning structure is damaged when placed on the bolt and/or when tensioning the bolt, with the result that the fitter can be injured.

This checking can be carried out as required in any manner and includes, for example, that the bolt overhang is measured and compared with the upper threshold value. The measurement can take place as required in any manner, for example, in the manner disclosed in EP 3 566 815 A1 and/or with the aid of the fastening arrangement for tensioning fixing means disclosed in EP 3 566 815 A1 and/or within the framework of the method for tensioning fixing means disclosed in EP 3 566 815 A1. The disclosure content of EP 3 566 815 A1 is herewith included in this description by reference in its full scope and particular with regard to the points specifically mentioned previously. In one form, release is only accomplished when the result of this check is positive. This means that, in one form, a positive result of this check is a necessary condition for the release and in particular must be present together with at least one of the remaining conditions which are mentioned in this patent application in connection with a release. The checking and/or release is accomplished, for example, by the processing unit.

In one form, the result of this check is signalled and/or displayed by a signal unit. This signalling and/or this display may be accomplished after every tensioning process and/or after the tensioning process of the last screw connection in the tensioning sequence.

Each of the signal units can be configured as required in any manner and includes, for example, at least one acoustic signal generator and/or at least one optical signal generator and/or at least one haptic signal generator. Each acoustic signal generator may include a loudspeaker. Each optical signal generator optionally includes a light and/or a red LED and/or a green LED and/or a flashing light and/or a display and/or a screen. Each haptic signal generator optionally includes a vibrator.

In one form of the method, the checking takes place continuously or is repeated at predetermined intervals.

This includes in particular checking whether the tool or the screw tensioning structure is correctly placed on the screw connection, is carried out continuously or repeated at predetermined intervals and/or checking whether a bolt overhang of the screw connection is greater than a predetermined threshold value, takes place continuously or is repeated at predetermined intervals.

The screw tensioning structure is, in one form, released as long as the result of this continuous or repeated checking is or remains positive and/or the screw tensioning structure is blocked or stopped as soon as the result of this continued or repeated checking is or becomes negative or not positive.

Furthermore, a manually movable tool for installation and/or maintenance of a flange connection including a multiplicity of screw connections is proposed. The tool includes at least one screw tensioning structure, a processing unit and a screw identification sensor, wherein the screw connections of the flange connection can be identified by the screw identification sensor. By the processing unit, an operation of the screw tensioning structure can only be released when the position of the tool above the screw connection predefined by the processing unit can be identified by the screw identification sensor. The tool additionally includes a sensor which is configured to detect a distance between the screw connection and the tool and/or a distance between the screw connection and the screw tensioning structure. By the sensor and the processing unit, it can be checked whether the tool or the screw tensioning structure is placed correctly on the screw connection. The screw tensioning structure can be released by the processing unit when the result of this check is positive and/or the screw tensioning structure can be blocked or stopped when the result of this check is negative or not positive.

The screw tensioning structure may be suitable for hydraulic tensioning of the screw connections of a flange connection. In one form, the screw tensioning structure is configured for rotating tensioning of the screw connections. For example, the screw tensioning structure is a hydraulic screw tensioning device.

In one form, the processing unit is arranged separately from the other components. In one form, this is connected, for example, in a cabled manner or via a radio connection at least to the screw tensioning structure, the screw identification sensor, a hydraulic pressure generator, a printer, another processing unit—for example, a server, a temperature sensor and/or a signal unit.

In one form, it is provided that the processing unit is arranged on the chassis. For example, the processing unit is configured as a tablet computer or laptop.

In one form, it is provided that a sequence of the tensioning of the screw connections can be predefined by the processing unit. For example, the processing unit has a software by which a tensioning sequence can be determined, optionally on the basis of the data, for example, gap dimensions, measured at the position of the respective screw connection in the flange connection.

In one form, it is provided that parameters of the tensioning for control and quality assessment can be predefined by the processing unit. For example, parameters to be achieved during tensioning can be predefined by the processing unit such as, for example, a screw identification number, the maximum force applied during tensioning, a hydraulic pressure, the maximum elongation value, a maximum permissible flange compression, a pre-tensioning force of the screw connection to be achieved and/or an angle of rotation and/or a tightening movement of the screw connection.

In one form, it is provided that an operation of the screw tensioning structure is blocked by the processing unit when the position of the tool above the screw connection predefined by a processing unit cannot be identified by the screw identification sensor. A pump or a hydraulic pressure generator of the screw tensioning structure can be controlled or put out of operation by the processing unit. A pump or a hydraulic pressure generator of the screw tensioning structure can be disconnected from the power by the processing unit.

Furthermore it is provided in one form that parameters of the tensioning can be documented by the processing unit. Parameters measured before, during or after the tensioning process can be transmitted to the processing unit and documented by this or can be printed and/or stored.

In another form, it is provided that the tool includes a printer for application of document data to the flange. In one form, the printer and screw identification sensor are arranged in a housing.

In one form, it is provided that the screw identification sensor is an optical read-out device, for example, a camera or a scanner. In another form, it is provided that the screw identification sensor is also configured as a sensor for measurement of gap dimensions between the first flange and the second flange which are assignable to a plurality of screw connections, for example as a camera.

In one form, it is provided that the tool includes a temperature sensor. An ambient temperature and/or a flange temperature can be measured by the temperature sensor. The temperature sensor may measure in a contact-free manner.

In one form, it is provided that the tool has a signal unit. It is provided in one form that a display of the position can be output by a signal unit. A qualitative display can be output by the signal unit, whether the tool is positioned above the screw connection to be tensioned or not. In another form, it is provided that a direction display can be output by the signal unit by which the shortest path to the next screw connection to be tensioned can be displayed. In yet another form, it is provided that at least one screw identification number and/or at least one parameter for tensioning the screw connection can be output by the signal unit. For example, the signal unit is configured as at least one light or display.

In one form, the tool includes a chassis. In another form, it is provided that the tool is movable manually by the chassis. The tool may be movable on the flange connection. Further, the chassis is configured in such a manner that this can be moved over the screw connection. Further, the chassis may have a number of rollers or wheels. In one form, the chassis carries at least the screw tensioning structure, the screw identification sensor and/or the processing unit.

For example, the chassis includes about three or about four rollers or wheels. The track width of the rollers or wheels may be configured in such a manner that the screw connections fit between these. Furthermore, the chassis may have a carrier plate on which at least the screw tensioning structure, the screw identification sensor and/or the processing unit are arranged. Rollers or wheels of the carrier plate may be configured in such a manner that the carrier plate is movable over the screw connections. Further, the carrier plate may have a recess through at least which the screw tensioning device can be lowered to tension a screw connection arranged thereunder. In one form, a cantilever which partially projects downwards is arranged on the chassis. The cantilever may project into a plane below the rollers or wheels. The screw identification device, the printer and/or the temperature sensor may be arranged on the cantilever, further optionally on a lower end of the cantilever in such a manner than the screw identification device, the printer and/or the temperature sensor can interact with the flange connection thereof.

In one form, it is provided that the tool has at least one handle which may be arranged on the chassis.

An exemplary form of the manually movable tool which can be used for installation and/or maintenance of a flange connection includes a chassis with rollers on which a screw tensioning structure and a screw identification sensor are arranged. A processing unit can be connected to the screw identification sensor and the screw tensioning structure via a radio connection or via at least one cable. Furthermore, a signal unit can be arranged on the chassis. The tool may have a handle which may be arranged on the chassis. This makes it easy to move the tool on the flange connection.

In an exemplary form, the tool has a printer by which the flange can be printed. The identification indicia can be applied to the flange connection by the printer. In another form, it is provided that all or some measured parameters are printed on the flange after tensioning the screw connection. The printer may be an ink jet printer.

The screw identification sensor is, for example, connected to the chassis via a cantilever. This allows an alignment of the screw identification sensor to identification indicia which are applied, for example on the inside to at least one flange of the flange connection, for example, by the printer. The screw identification sensor is for example configured as an optical scanner but, as stated above, can also be configured as a camera or radio sensor e.g., for reading out transponders. The screw connections can be identified by the screw identification sensor. A temperature sensor is arranged, for example, on the cantilever by which a temperature of the flange, the screw connection and/or the surroundings can be measured. A signal, for example from the screw identification sensor, is sent to the processing unit which evaluates the signal. If the processing unit identifies by the signal that the tool is positioned above the screw connection to be tensioned, operation of the screw tensioning structure can be released. Furthermore, via the processing unit a signal can be output via the signal unit so that, for example, the fitter knows that the tool is positioned above the screw connection to be tensioned. The fitter can then tension the screw connection to be tensioned with the screw tensioning structure.

Furthermore, a use of one of the proposed manually movable tools, in one of the proposed methods for installation and/or maintenance of a flange connection is proposed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

the FIGURE shows a tool on a flange connection according to the principles of the present disclosure.

Figure 1:
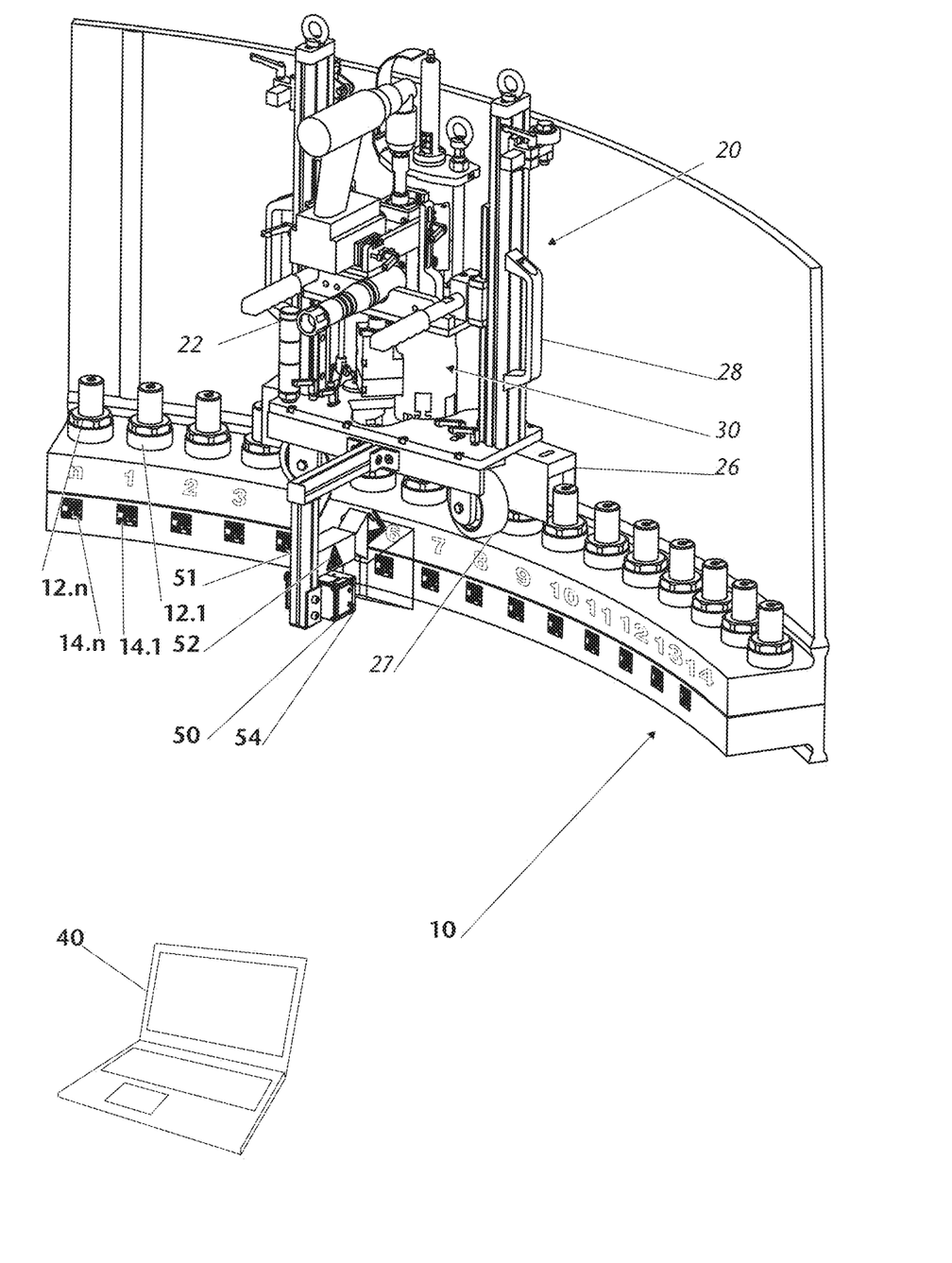

The drawing described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The FIGURE shows a manually movable tool 20 which can be used for installation and/or maintenance of a flange connection 10. The flange connection 10 includes a number of screw connections 12.1 to 12.n which are not all designated for the sake of clarity. The screw connections 12.1 to 12.n are introduced and screwed by hand before a first assembly into the non-designated flange recesses of the flange connection 10 arranged one above the other in pairs. Each screw connection 12.1 to 12.n is assigned an identification indicia 14.1 to 14.n wherein the assignment is one to one. Not all the screw connections 12.1 to 12.n and identification indicia 14.1 to 14.n are shown or designated in the FIGURE for the sake of clarity. The identification indicia 14.1 to 14.n are applied to the flange connection 10 on the inside, printed on by the printer 52. In the example illustrated, the identification indicia 14.1 to 14.n are configured as optically readable code, as QR code and/or printed on as numbers in clear text.

The tool 20 includes a chassis 26 with rollers 27 on which a screw tensioning structure 30 and a screw identification sensor 50 are arranged. A processing unit 40 is connected via a radio connection to the screw identification sensor 50 and the screw tensioning structure 30. Furthermore, a signal unit 22 is arranged on the chassis 26. A handle 28 enables easy movement of the tool 20 on the flange connection 10.

The screw identification sensor 50 is connected to the chassis 26 via a cantilever 51. This allows an alignment of the screw identification sensor 50 onto the identification indicia 14.1 to 14.n. The screw identification sensor 50 is configured as an optical scanner but, as stated in the general description, can also be configured as a camera or radio sensor for reading out transponders. The screw connections 12.1 to 12.n are identified by the screw identification sensor 50. A signal is sent to the processing unit 40, which assesses this. If the processing unit 40 detects by the signal that the tool 20 is positioned above the screw connection 12 to be tensioned, this releases the operation of the screw tensioning structure 30. Furthermore, the processing unit 40 outputs a signal via the signal unit 22 so that the fitter knows that the tool 20 must be positioned over the next screw connection to be tensioned. The fitter can then tension the screw connection to be tensioned with the screw tensioning structure 30.

A temperature sensor 54 is also arranged on the cantilever 51 by which a temperature of the flange connection 10, the screw connection 12.1 to 12.n or surroundings can be measured.

With the proposed method, the tool and the use a manual assembly of the flange connection 10 can advantageously be made without there being the risk that a screw connection 12.1 to 12.n is forgotten to be tensioned or an incorrect sequence of a predefined tensioning sequence is executed or a screw connection is pre-tensioned not at all, multiple times or too frequently. Also a complex tensioning sequence for a fitter can advantageously be easily carried out since an incorrect tensioning sequence is avoided by the tool 20. A particular advantage is the reduction of human error and/or tampering by a fitter.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for installation and/or maintenance of a flange connection comprising a plurality of screw connections with a manually movable tool at least comprising a screw tensioning structure, a processing unit and a screw identification sensor, wherein the method comprises:
   assigning a one-to-one identification to each screw connection of the flange connection;
   determining a respective screw connection to be tensioned;
   positioning the tool on the respective screw connection to be tensioned;
   identifying the respective screw connection by the screw identification sensor;
   releasing the screw tensioning structure by the processing unit; and
   tensioning the respective screw connection by the screw tensioning structure;
   wherein it is checked whether the tool or the screw tensioning structure is placed correctly on the respective screw connection; and
   wherein the screw tensioning structure is released when the result of this check is positive and/or the screw tensioning structure is blocked or stopped when the result of this check is negative;
   wherein:
   parameters of the tensioning of the respective screw connection are documented by the processing unit; and/or
   at least one parameter of the tensioning of the respective screw connection is documented on the flange connection; and/or
   at least one parameter of the tensioning of the respective screw connection is signalled and/or displayed by a signal unit, wherein the signalling and/or this display takes place after each tensioning process and/or after the tensioning process of the last screw connection in a tensioning sequence; and/or
   a conclusion protocol and/or an error protocol and/or recommendations for the correction of defective screw connections are created and signalled and/or displayed by a signal unit, wherein this signalling and/or this display takes place after each tensioning process and/or after the tensioning process of the last screw connection in a tensioning sequence.

2. The method according to claim 1, wherein the screw connections are characterized one-to-one by identification indicia.

3. The method according to claim 2, wherein the screw identification sensor reads out the identification indicia which is assigned to the screw connection above which the tool is positioned.

4. The method according to claim 3, wherein the readout of the identification indicia is carried out continuously or at intervals.

5. The method according to claim 2, wherein radio-readable chips, optical codes and/or absolute or relative positions on the flange connection are used as identification indicia.

6. The method according to claim 1, wherein the respective screw connection is identified by the screw identification sensor when releasing the screw tensioning structure by the processing unit and when tensioning the respective screw connection by the screw tensioning structure.

7. The method according to claim 1, wherein the release of the screw tensioning structure only takes place when:
there is a correct positioning of the tool; and/or
a release of the next process step only takes place when the respective screw connection to be tensioned has been correctly identified and determined by the screw identification sensor; and/or
a correct or incorrect positioning of the tool is signalled by a signal unit; and/or
a function of the tool is blocked when an incorrect positioning is identified.

8. The method according to claim 1, wherein:
a tensioning sequence is determined or predefined by the processing unit, by which the respective screw connection to be tensioned is determined; and/or
the tool comprises a printer by which identification indicia and/or documentation data are applied to the flange connection.

9. The method according to claim 1, wherein:
it is checked whether a bolt overhang of the respective screw connection is greater than a predetermined lower threshold value; and
the screw tensioning structure is released when the result of this check is positive and/or the screw connection structure is blocked or stopped when the result of this check is negative.

10. The method according to claim 1, wherein:
it is checked whether a bolt overhang of the screw connection is smaller than a predetermined upper threshold value; and
the screw tensioning structure is released when the result of this check is positive and/or the screw connection structure is blocked or stopped when the result of this check is negative.

11. The method according to claim 10, wherein the checking takes place continuously or is repeated at certain intervals.

* * * * *